United States Patent
Hagen

[19]

[11] Patent Number: 5,824,380
[45] Date of Patent: Oct. 20, 1998

[54] PACKAGE RECLOSURE LABEL AND PACKAGE

[75] Inventor: Ronald G. Hagen, Larsen, Wis.

[73] Assignee: Menasha Corp., Neenah, Wis.

[21] Appl. No.: 842,312

[22] Filed: Apr. 24, 1997

Related U.S. Application Data

[60] Provisional application No. 60/017,214, May, 9, 1996 and 60/017,238, May 10, 1996.

[51] Int. Cl.$^6$ .......................................................... B32B 3/04
[52] U.S. Cl. .......................... 428/41.9; 428/40.1; 428/43; 428/126; 383/62; 383/89
[58] Field of Search ................... 428/40.1, 41.9, 428/43, 126; 383/62, 89

[56] References Cited

U.S. PATENT DOCUMENTS

| | | | |
|---|---|---|---|
| 1,681,769 | 8/1928 | Heston | 283/81 |
| 2,098,164 | 11/1937 | Rice | 40/21 |
| 2,153,310 | 4/1939 | Newman | 24/17 |
| 3,946,507 | 3/1976 | Fergg et al. | 40/2 R |
| 4,008,851 | 2/1977 | Hirsch | 383/71 X |
| 4,479,838 | 10/1984 | Dunsirn et al. | 156/247 |
| 4,526,405 | 7/1985 | Hattemer | 283/81 |
| 4,543,139 | 9/1985 | Freedman et al. | 156/152 |
| 4,584,201 | 4/1986 | Boston | 426/106 |
| 4,622,799 | 11/1986 | Boston | 53/415 |
| 4,679,693 | 7/1987 | Forman | 206/610 |
| 4,840,270 | 6/1989 | Caputo et al. | 206/205 |
| 4,902,141 | 2/1990 | Linnewiel | 383/61 |
| 4,911,563 | 3/1990 | Ciani | 383/89 |
| 4,966,780 | 10/1990 | Hargraves et al. | 426/118 |
| 4,982,845 | 1/1991 | Prascak et al. | 206/621 |
| 5,029,712 | 7/1991 | O'Brien et al. | 206/621 |
| 5,035,518 | 7/1991 | McClintock | 383/70 |
| 5,125,211 | 6/1992 | O'Brien et al. | 53/412 |
| 5,154,293 | 10/1992 | Gould | 206/461 |
| 5,161,687 | 11/1992 | Kornell et al. | 206/447 |
| 5,366,087 | 11/1994 | Bane | 206/459.5 |
| 5,387,453 | 2/1995 | Cummisford | 428/77 |
| 5,399,403 | 3/1995 | Instance | 428/40 |
| 5,511,883 | 4/1996 | Clark et al. | 383/82 X |
| 5,582,889 | 12/1996 | Pedrini | 383/62 X |

FOREIGN PATENT DOCUMENTS

| | | | |
|---|---|---|---|
| 517566 | 12/1992 | European Pat. Off. | 383/89 |
| 2173770 | 10/1986 | United Kingdom | 383/71 |
| 2248052 | 3/1992 | United Kingdom | 383/62 |

*Primary Examiner*—Alexander Thomas
*Attorney, Agent, or Firm*—Quarles & Brady

[57] ABSTRACT

A package reclosure label has a base label which is secured by a pressure-sensitive adhesive to the package. A Z-folded top sheet has a first panel permanently adhered to the upper surface of the base sheet, a second panel folded back over the first panel with an edge extending past the first panel that is releasably adhered to the base sheet, and a third panel folded back over the second panel and extending beyond the second panel to a tab which is resealably adhered to the package. The label can be opened or extended by lifting the tab off the package and breaking the releasable bond between the second panel and the base sheet. Multiple labels can be stored and shipped on a reel of release liner by adhering them to the release liner by the pressure-sensitive adhesive on the back of the base sheet and by the resealable adhesive on the back of the tab.

14 Claims, 5 Drawing Sheets

PACKAGE RECLOSURE LABEL AND PACKAGE

This application claims the benefit of U.S. Provisional patent application Ser. Nos. 60/017,214 filed May 9, 1996 and 60/017,238 filed May 10, 1996.

BACKGROUND OF THE INVENTION

1. Field of the Invention

This invention relates to a label which is adhered to the exterior of a product bag for holding the open top of the bag reclosed after the bag is opened.

2. Discussion of the Prior Art

As is well-known, it is often desirable to reclose the top of a bag after it has been opened. For example, a bag of coffee, potato chips or other food may be opened and less than all of the entire contents removed. To preserve the contents, the top of the bag is usually folded over on itself one or more times and resealed with a clothes pin, a special purpose package closing clip or clamp, or a resealable adhesive strip. See for example U.S. Pat. Nos. 2,153,310; 3,946,507; 4,622,799; 4,902,141; and 5,366,087.

A need exists for a package reclosure label which can be inexpensively manufactured, easily applied in automated package production operations, does not interfere with distribution or handling of the package prior to consumer purchase, is easy for the consumer to use, can be made of recyclable materials, and provides promotion opportunities.

SUMMARY OF THE INVENTION

The present invention provides a package reclosure label and package which fulfills these needs. A package reclosure label of the invention has a base sheet and a multi-panel top sheet. The top sheet is accordion-folded with first, second, and third panels serially connected along respective first and second fold lines. An area of adhesive forming a releasable bond on the second panel adjacent to the second fold holds the first fold closed, and the third panel extends from the second fold to a tab area which is beyond the first fold. An area of adhesive forming a resealable bond is provided on the bottom side of the top sheet in an area of the tab which holds the second fold closed and is adherable to the flap of the package for holding the package reclosed.

In an especially preferred form, a dry residue adhesive forms the releasable bond holding the first fold closed. Thus, after the label is initially opened, thereby breaking the bond of this adhesive, this adhesive will present a tack-free surface, which will not collect dirt or other debris.

In another useful aspect of the invention, the second panel extends from the first fold beyond a free end of the first panel and the releasable adhesive adheres the second panel in an area of the second panel which is beyond the free end. This provides additional printing area, and a greater extended length to the label, for a greater reach to secure a folded over flap of a reclosed package. In addition, in this aspect, the releasable adhesive may secure the second panel to the base sheet, which facilitates production, storage and shipment of the labels, as well as application of them to the packages.

Another advantage of the invention is that paper or other sheet type materials can be used to make the labels. Ordinary pressure sensitive base sheet stock mounted on release liner can be used, and the top sheet folded from ordinary flat sheet stock and adhered to the base sheet and release liner, and in final application to the package, the base sheet and top sheet tab adhered to the package.

In another preferred aspect, spaced apart perforations are formed in the top sheet from one side edge to the other. This is useful so that between the perforations a coupon or other promotional item can be printed, using one or both sides of the top sheet. The coupon can then be removed from the remainder of the top sheet and redeemed or otherwise used. Preferably, the perforations are spaced as far apart as possible to maximize the printing area between the perforations. In this respect, the advantages of using a dry residue releasable adhesive to secure the first fold are particularly realized, since the tack-free surface presented by such an adhesive is positioned between the perforations, in the coupon area of the top sheet.

These and other objects and advantages of a label and package of the invention will be apparent from the detailed description and drawings.

DETAILED DESCRIPTION OF THE PREFERRED EMBODIMENTS

Figure 1:
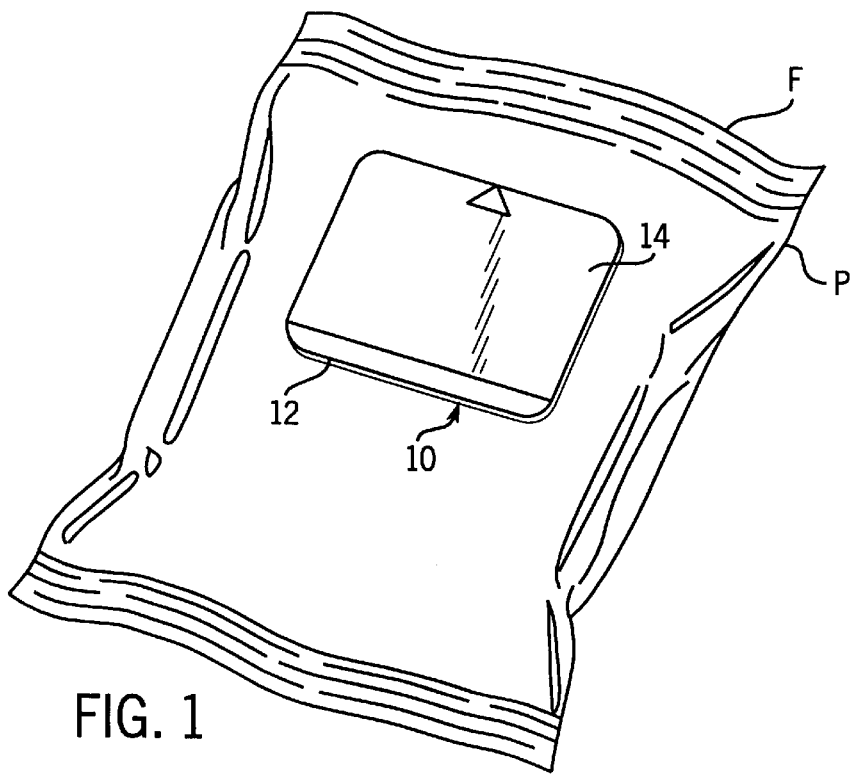
FIG. 1 is a perspective view of an unopened package provided with a reclosure label of the invention.
Figure 2A:
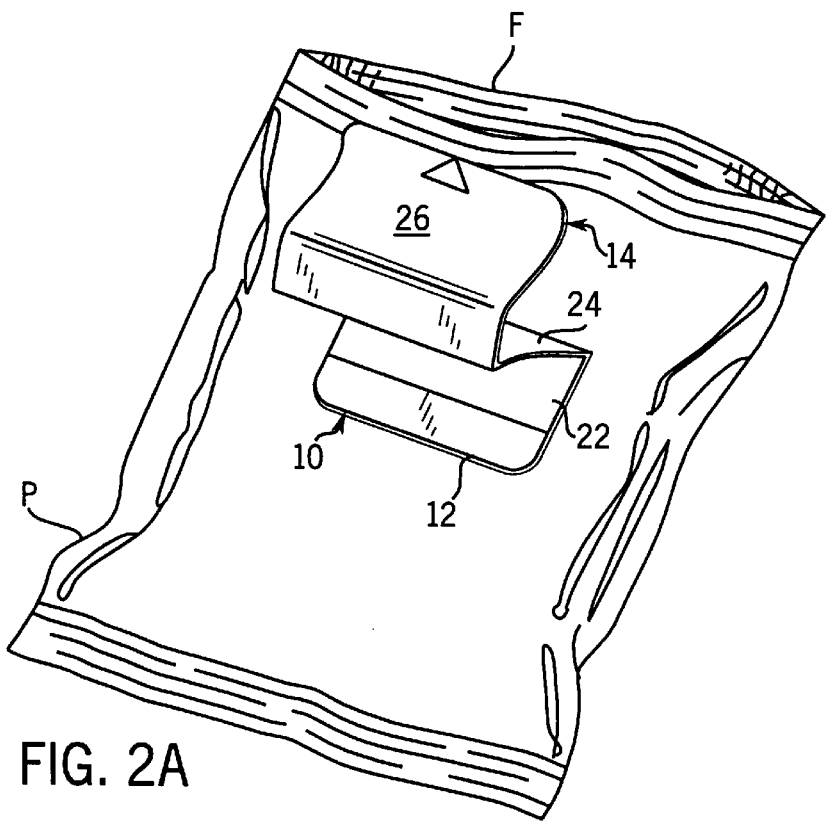
FIG. 2A is a perspective view of the same package opened with the label of the invention partially opened.
Figure 2B:
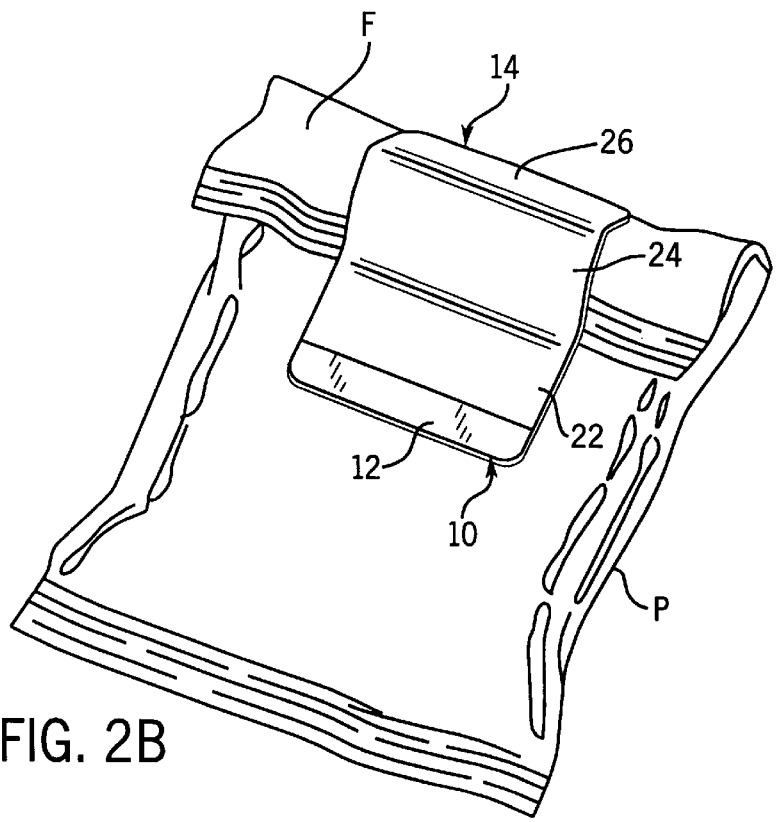
FIG. 2B is a perspective view of the same package reclosed with the label of the invention.
Figure 3:
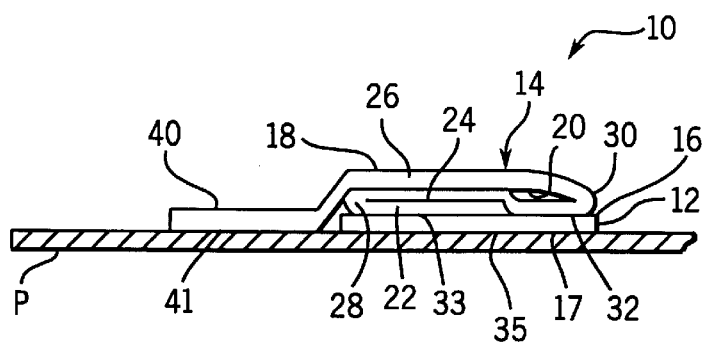
FIG. 3 is a side plan view of a label of the invention, shown with material thicknesses enlarged for purposes of illustration.
Figure 4:
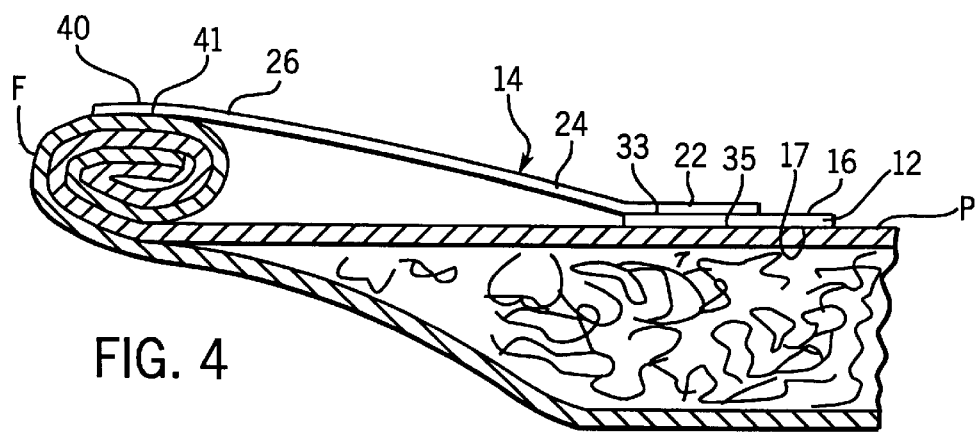
FIG. 4 is a side plan view of the label of FIG. 3 opened up (extended) and holding closed the flap of a package with material thicknesses enlarged for purposes of illustration.
Figure 5:
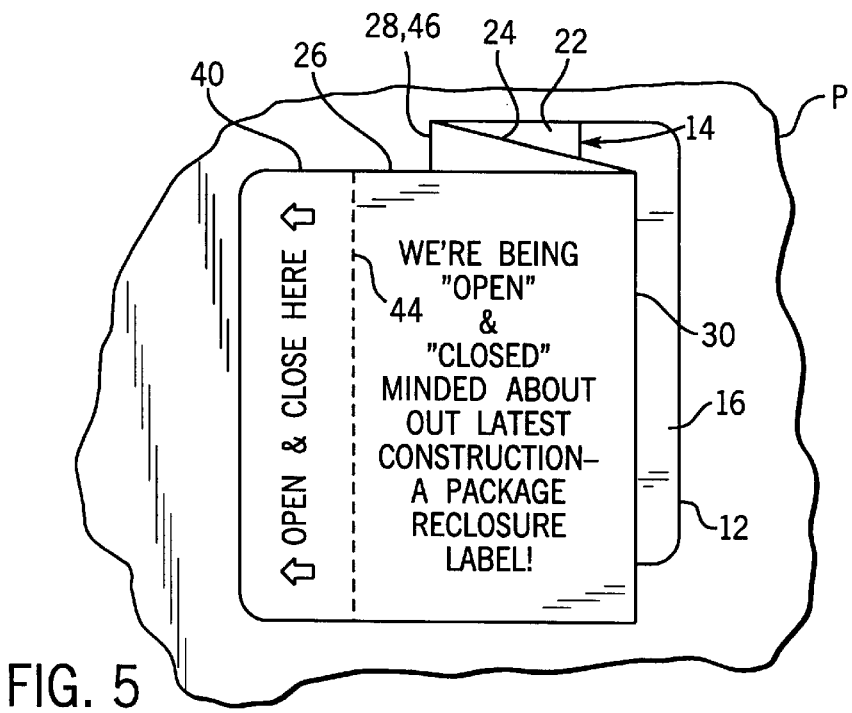
FIG. 5 is a perspective view of the label of FIG. 4 as it is being opened up or extended.

FIG. 1 illustrates an unopened package P which has been applied with a reclosure label 10 of the invention in a body area of the package. As shown in FIGS. 1 and 3, the label 10 is closed. After the package P is opened (FIG. 2A), part of its contents removed, and desired to be reclosed, the top flap of the package is folded over one or more times toward the label 10 as shown in FIGS. 2B or 4. The label 10 is then opened up or extended as shown in FIGS. 2A, 2B, 4, and 5 and adhered to the folded over flap of the package P (FIGS. 2B and 4), so as to maintain the flap F folded over in the reclosed position.

Figure 6:
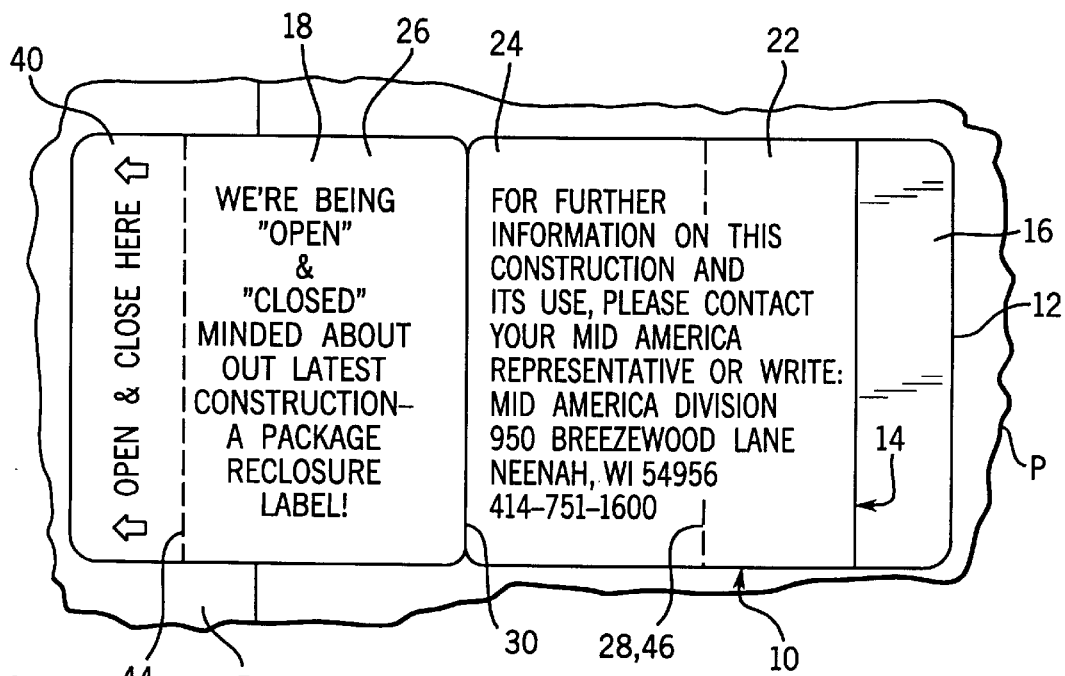
FIG. 6 is a top view of the label of FIG. 4 in the extended state.

As shown in FIGS. 3–8, the label 10 has a base sheet 12 to which is adhered an accordion-folded (generally Z-folded) top sheet 14. The base sheet 12 has a top side 16 and a bottom side 17, and the top sheet 14 also has a top side 18 and a bottom side 20. The terms "top" and "bottom" as used to refer to the sides of the top sheet 14 refer to the top and bottom of the sheet 14 when it is extended as shown in FIG. 6. This terminology also applies when the top sheet is Z-folded (closed) as shown in FIG. 3.

As stated, the top sheet 14 has multiple panels. Specifically, the top sheet 14 has first 22, second 24, and third 26 panels. The first panel is integrally connected to the second panel 24 along a first fold 28 and the opposite edge of the second panel 24 is integrally connected to the third panel 26 along a second fold 30.

The base label 12 is separate from the top sheet 14 and is approximately the same size as the second panel 24. The base label 12 and second panel 24 are wider than the first panel 22 so that the edge area of the second panel 24 extends beyond the free end of the first panel 22 so as to be adhered at bond area 32 to the base label 12. The adhesive preferred for this bond 32 is preferably a releasable dry residue adhesive that once broken is not resealable, although any releasable type of adhesive could be used, for example, a low-tack, hot-melt adhesive, or a low-tack, pressure-sensitive adhesive. It is understood that the surfaces of the base label 12 and/or of the second panel 24 in the area of the adhesive 32 may be treated or coated with a varnish or one or more other suitable coatings so that the seal created by the area 32 of adhesive may be broken without tearing the fibers of either the second panel 24 or of the base label 12, both of which may be made of paper.

Figure 9:
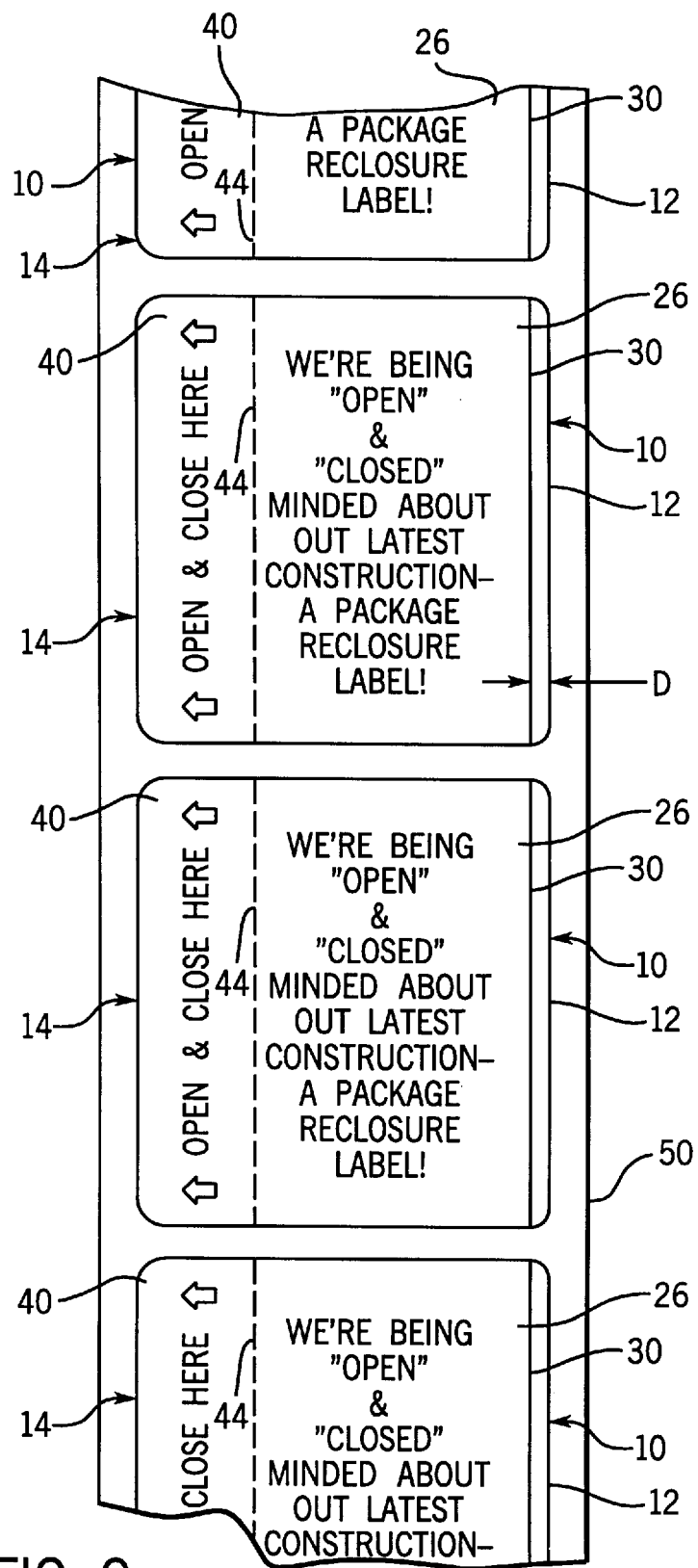
FIG. 9 is a top plan view of multiple labels of the preceding figures carried on a continuous release liner prior to application to the packages to which the labels are adhered.

The bottom side of the top sheet 14 in the bond area 33 of the first panel 22 is adhered to the base label 12, preferably with an adhesive which forms a strong permanent bond to the base label 12. Also, the base label 12 is adhered to the package P with an adhesive 35 which forms a strong bond, preferably a pressure-sensitive adhesive. A pressure-sensitive adhesive is preferred for the adhesive 35 on the bottom side of the base label 12 since such an adhesive may also be used to secure the label 10 to a strip of silicone-coated release liner prior to application of the label 10 to the package P, as shown in FIG. 9 and further discussed below.

The third panel 26 extends from second fold 30 over the second panel 24 and beyond the far edge of the second panel 24 past first fold 28 to a tab portion 40. The bottom side of the top sheet 14 in the bond area 41 of the tab portion 40 has applied to it a low-tack adhesive which may be resealed many times to the flap of the package. Until the label 10 is first opened, the low-tack adhesive in the area 41 on the underside of the tab 40 holds the tab 40 securely against the body of the package. Preferably, the area 41 of low-tack adhesive is provided a short distance in from the free end of the tab 40 (See FIG. 8), so as to provide a small flap 43 of paper at the free end of the third panel 26 for the user to grasp to unseal the area 41 of adhesive on the back side of the tab 40. This adhesive is preferably a hot-melt adhesive which forms a secure bond to the tab 40 and maintains a low level of tack through repeated resealings.

Figure 7:
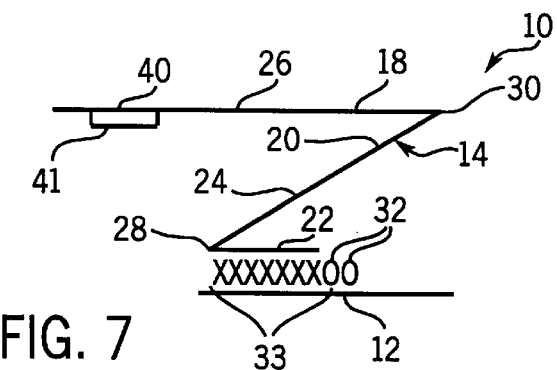
FIG. 7 is a schematic view illustrating an end view of the label partially opened up and identifying with X's, O's and a rectangle different bond areas on the label.
Figure 8:
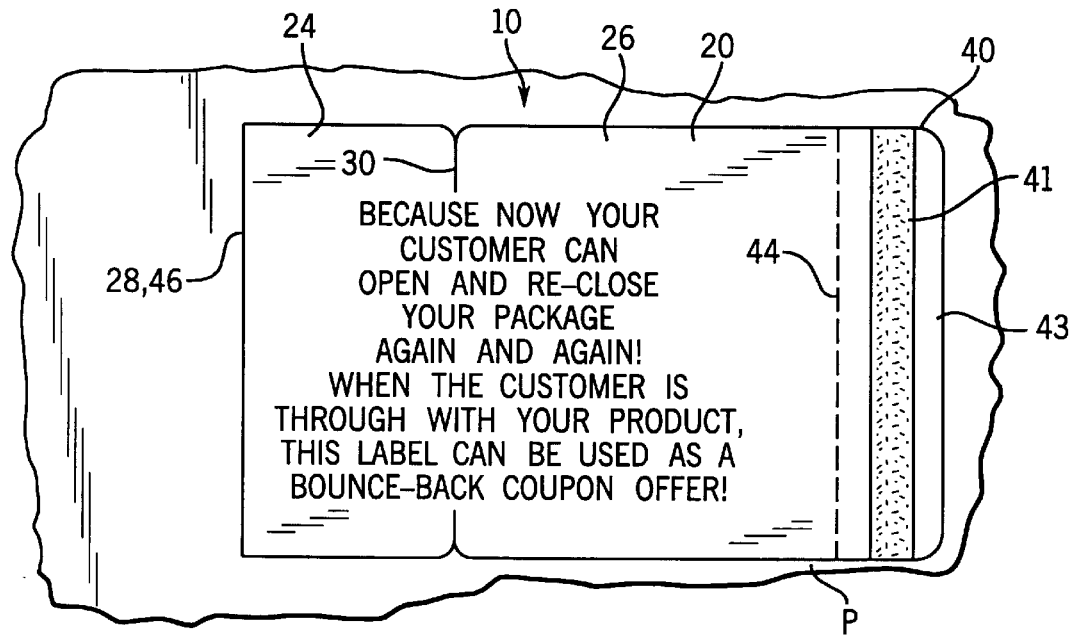
FIG. 8 is a plan view of the label of FIG. 5 folded back to show its bottom side.

In summary, a schematic end view of the label partially opened is shown in FIG. 7. X's denote the permanent bond area 33 which adheres the first panel 22 to the base sheet 12. O's denote the releasable bond area 32 which temporarily secures the second panel 24 to the base sheet 12, holding the first fold 28 closed. The rectangular box on the underside of the tab 40 denotes the resealable bond area 41, which secures the third panel 26 to the package P before the package is reclosed, to the package flap when the package is reclosed and to the strip of release liner before the label 10 is applied to the package, as shown in FIG. 9. Adhesive 35 on the bottom side of the base sheet is not shown in FIG. 7, although preferred, it being understood that the invention could be applied to a base sheet having pressure sensitive adhesive on its bottom side, a solvent activated adhesive on its bottom side, or no adhesive preapplied to its bottom side, prior to application of the label 10 to the package P.

As shown in FIG. 6, the top sheet 14 is preferably provided with two spaced apart perforations 44 and 46 which extend across the top sheet 14 from one side edge to the other. The perforations 44 and 46 are positioned in the top sheet 14 between the first panel 22 and the adhesive area 41 on the back side of the tab 40 and facilitate tearing the top sheet 14 along them. The perforation 46 is provided along and coincident with the first fold 28 and the perforation 44 is provided in the tab 40 between the adhesive bond area 41 of the tab and the second sheet 24, preferably relatively close to the adhesive area 41 on the back of the tab 40 to provide additional room for printing between the perforations. The area of the top sheet 14 between the perforations 44 and 46 may be printed on either or both sides so as to provide opportunities for promotion of the product in the package or related products. For example, the area between the perforations 44 and 46 may be a coupon which may be separated from the remainder of the top sheet 14 along the perforations 44 and 46 and used for a discount on the purchase of the product advertised in the coupon.

For production of the labels 10, handling, shipping and application of the labels 10 to packages P, a quantity of the labels 10 would typically be provided on a strip 50 of silicone treated release liner as shown in FIG. 9 and the strip of release liner rolled up. The labels 10 are oriented on the release liner with their open edges (referred to as side edges above, which are the edges between which the perforations 44 and 46 and the folds 28 and 30 extend) perpendicular to the machine direction, i.e., perpendicular to the long edges of the liner 50, so that the perforations 44 and 46 and folds 28 and 30 are parallel to the machine direction. When the label 10 is applied to a package P, the perforations and folds are parallel to the top of the package, which is the end to be opened.

As stated above, the pressure sensitive adhesive 35 on the underside of the base sheet 12 and the area of resealable adhesive 41 hold each label 10 to the surface of the liner 50 until the labels 10 are applied to packages P. It is noted that a side view (looking at the open edges) of a label 10 mounted on the release liner 50 would be the same as FIG. 3, except that the package P would be replaced by the release liner 50.

In production, standard base sheet stock would typically be used which consists of a continuous paper layer on top of a continuous silicone treated release liner of indeterminate length with pressure-sensitive adhesive 35 carried on the underside of the paper layer (which becomes base sheet 12) releasably adhering it to the release liner 50. The base sheet is slit down to (but not through) the release liner 50 and the waste side (the left side as viewed in FIG. 9) is stripped from the release liner and discarded. This process is preferably done continuously on an in-line press. In production, a web of the top sheet paper (or other sheet material) is also printed in-line with the printed indicia of serially connected top sheets, including printing on or otherwise applying any varnish, sealant, adhesion agent or other coating, for example in the area of the releasable adhesive 32 to prevent tearing of the paper fibers. After printing, the continuous top sheet web is folded at a folding station of the in-line press, and a stripe of hot melt adhesive is applied to the top sheet web in the area 41, which stripe may run continuously along the length of the top sheet web in the area 41. The adhesives forming the bonds 32 and 33 may be applied to either the top of the continuous remainder of the base sheet left on the release liner or to the top sheet in the designated areas, as continuous stripes. In the preferred embodiment, in the area of bond 32, a first coating is applied to the base sheet 12, followed by a second coating in the same area, and the adhesive which forms the permanent bond in area 33 is applied in both area 33 and area 32. The first and second coatings, identified specifically below, make the bond area 32 releasable, but since they are not applied in the area 33, do not reduce the bond strength in that area.

The continuous folded top sheet web with the stripe of adhesive 41 applied and the continuous base sheet web (with adhered release liner) are then brought together, the adhesives at least partially cured, and the final cuts made, down to the release liner 50, which cuts separate the base sheets and top sheets of the individual labels 10 from the adjacent labels 10. The waste matrix left outside of the cuts between the labels 10 and along the longitudinal sides (as viewed in FIG. 9) is stripped from the release liner 50 and discarded. It is noted that the second fold 30 is preferably spaced a small distance D (FIG. 9) inward from the edge of the base sheet 12 so that the final cuts do not cut through the fold 30.

Many different materials may be used for the base sheet, top sheet and adhesives to practice the invention. The important properties of these materials will be apparent to those of ordinary skill in the art from this description. In one form, the following materials have been found suitable:

Base sheet stock including release liner and pressure sensitive adhesive 35: semi-gloss face sheet, B-101 adhesive and 40# release liner, commercially available from Brownbridge Industries, Brownbridge, Ohio.

Top sheet paper stock: 60# semi-gloss litho coated two sides, available from International Paper, Memphis, Tenn.

First coating on base sheet in area 32: Oil Can Varnish WKA 00014F, available from Sun Chemical General Printing Ink Division, Carlstadt, N. J.

Second coating on base sheet in area 32: PCF3512/RAW00146, available from Flint Ink Corporation, Detroit, Mich.

Adhesive over areas 33 and 32: H. B. Fuller 3487, available from H. B. Fuller Company, Vadnais Heights, Minn.

Adhesive in area 41: H. B. Fuller HL 2272 hot melt adhesive, available from H.B. Fuller Company, Vadnais Heights, Minn.

Many modifications and variations to the preferred embodiment described will be apparent to those skilled in the art. For example, the base sheet and first panel could be made integral with one another, rather than being adhered together. Also, the invention may be practiced without any perforations. Therefore, the invention should not be limited to the preferred embodiment described but should be defined by the claims which follow.

We claim:

1. A package reclosure label comprising:
    a base sheet having a top surface and a bottom surface;
    a multi-panel top sheet having a top side and a bottom side, said top sheet being accordion-folded with first, second, and third panels serially connected along fold lines, said first panel being connected to said second panel along a first fold at one edge of said second panel, and said third panel being connected to said second panel along a second fold at an opposite edge of said second panel, said third panel extending from said second fold to a tab area of said third panel which is beyond said first fold;
    an area of adhesive forming a releasable bond on said top side of said top sheet in an area of said second panel which is adjacent to said second fold, said area of releasable adhesive holding said first fold closed; and
    an area of adhesive forming a resealable bond on the bottom side of said top sheet in an area of said tab, said resealable bond area holding said second fold closed and being adherable to said package for holding said package reclosed.

2. A package reclosure label as claimed in claim 1, wherein said releasable bond is formed by a dry residue adhesive.

3. A package reclosure label as claimed in claim 1, wherein said second panel extends from said first fold beyond a free end of said first panel and said releasable bond adheres said second panel in an area of said second panel which is beyond said free end.

4. A package reclosure label as claimed in claim 3, wherein said releasable bond secures said second panel to said base sheet.

5. A package reclosure label as claimed in claim 1, wherein said base sheet and said top sheet are separate and said third panel is adhered to said base sheet.

6. A package reclosure label as claimed in claim 1, wherein spaced apart perforations are formed in said top sheet extending from one side edge thereof to the other.

7. A package reclosure label as claimed in claim 6, wherein said perforations are positioned between said area of resealable bond and said third panel.

8. A package reclosure label as claimed in claim 7, wherein one of said perforations is coincident with said first fold.

9. A package reclosure label as claimed in claim 8, wherein the other of said perforations is formed in said third panel between said second fold and said resealable bond area.

10. A package reclosure label as claimed in claim 1, wherein said base sheet has an end adjacent to said first fold.

11. A package reclosure label as claimed in claim 1, wherein a pressure sensitive adhesive is provided on said bottom surface of said base sheet.

12. A package having adhered to it a package reclosure label as claimed in claim 1.

13. A package as claimed in claim 12, wherein said bottom side of said base sheet is adhered to said package and said resealable bond adheres said tab to said package.

14. A package as claimed in claim 13, wherein said label is opened up so that said first, second and third panels are unfolded and said base sheet is adhered to a body area of said package and said tab is adhered to a flap area of said package.

* * * * *